United States Patent
Moriarty et al.

(10) Patent No.: US 6,192,082 B1
(45) Date of Patent: Feb. 20, 2001

(54) DIGITAL TELEVISION DATA FORMAT CONVERSION WITH AUTOMATIC PARITY DETECTION

(75) Inventors: Michael P. Moriarty, Spring; Thanh T. Tran, Houston, both of TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/191,917

(22) Filed: Nov. 13, 1998

(51) Int. Cl.[7] .................................................. H04B 1/66
(52) U.S. Cl. .................................. 375/240.26; 348/425.3
(58) Field of Search ........................... 348/384, 441, 348/469, 470–472, 467, 466, 425.1–425.3, 426.1; 375/240.26, 240.27

(56) References Cited

U.S. PATENT DOCUMENTS

| | | | |
|---|---|---|---|
| 4,447,902 | 5/1984 | Wilkinson | 371/39 |
| 4,491,861 | * 1/1985 | Sochor | 358/13 |
| 4,549,227 | * 10/1985 | Hashimoto et al. | 358/328 |
| 4,577,237 | 3/1986 | Collins | 358/336 |
| 4,730,223 | 3/1988 | Ikeda et al. | 358/335 |
| 5,404,248 | * 4/1995 | Shimoda et al. | 360/48 |
| 5,414,830 | * 5/1995 | Marbot | 395/500 |
| 5,640,332 | * 6/1997 | Baker et al. | 345/197 |
| 5,903,569 | * 5/1999 | Fujisaki | 370/472 |

OTHER PUBLICATIONS

Video, Audio, and Data Recording Formats, Adaptec Inc., Aug. 3, 1998, pp. 1–10, http://www.adaptec.com/technology/standards/1394formats1.html.

SAA7111 Video Input Processor (VIP) Data Sheet, Philips Semiconductors, May 15, 1998.

* cited by examiner

*Primary Examiner*—Victor R. Kostak
(74) *Attorney, Agent, or Firm*—Akin, Gump, Strauss, Hauer & Feld, LLP

(57) ABSTRACT

A digital television (DTV) data format converter of a system automatically detects whether a serial data stream includes parity data and converts the serial DTV data stream to a parallel DTV data stream. The DTV data format converter transmits the parallel DTV data stream converted from the serial DTV data stream in accordance with a first conversion protocol if the serial DTV data stream includes parity data. If the serial DTV data stream does not include parity data, the converter transmits the parallel DTV data stream converted from the serial DTV data stream in accordance with a second conversion protocol. In this way, the converter accommodates a serial DTV data stream with or without parity data. The DTV data format converter may be implemented in the form of a peripheral component interconnect (PCI) card, permitting compatibility with computer systems and other PCI-based systems. The DTV data format converter may include a receiver block, a transmitter block, and a buffer.

32 Claims, 6 Drawing Sheets

DIGITAL TELEVISION DATA FORMAT CONVERSION WITH AUTOMATIC PARITY DETECTION

BACKGROUND OF THE INVENTION

1. Field of the Invention

The present invention relates to digital television data reception by computer systems, and more particularly to digital television data format conversion with automatic parity detection.

2. Description of the Related Art

The advent of digital television technology has presented significant opportunities for the computer industry. Computer systems are expected by many to join traditional consumer television products as mainstream devices for receiving digital television (DTV) signals. A DTV-enabled computer system will likely include a DTV receiver for receiving DTV signals.

While analog television signals have generally been homogeneous in data format, digital television has permitted various data formats of DTV signals. In industry today, for example, some equipment transmits a DTV data stream in a serial data format. Certain other equipment though has expected to receive a DTV data stream in a parallel data format. Also, serial DTV data streams outputted by equipment may or may not include parity data for error correction.

DTV data broadcasters will soon provide DTV data streams to DTV decoders within computer systems. A DTV data broadcaster may directly provide a serial DTV data stream to the DTV decoder. Alternatively, the DTV data broadcaster may provide a serial DTV data stream to a television tuner which then provides the serial DTV data stream to the DTV decoder. If the DTV data broadcaster intended a serial DTV data stream to be delivered directly to the DTV decoder, then the serial DTV data stream has not included parity data. If the DTV data broadcaster intended a serial DTV data stream to be transmitted over the air to a television tuner, then the serial DTV data stream has included parity data. The television tuner has used the parity data to perform the necessary error correction. The tuner typically provided an 8-bit parallel DTV data stream to the DTV decoder. While the DTV decoder has not utilized the parity data, the DTV decoder has expected the size of the DTV data stream to reflect inclusion of parity data. A DTV data stream without parity data has typically occupied 188 bytes, and a DTV data stream with parity data has typically occupied 204 bytes. If a DTV data stream including no parity data has been provided directly to the DTV decoder, the DTV decoder has not operated properly.

When a DTV data stream has been provided to a DTV decoder of a computer system, it has not been known beforehand whether the DTV data stream contained parity data.

SUMMARY OF THE INVENTION

Briefly, in accordance with the present invention, a digital television (DTV) data format converter of a system automatically detects whether a serial DTV data stream includes parity data and converts the serial DTV data stream to a parallel DTV data stream. The DTV data format converter provides one transmission protocol if the serial DTV data stream includes parity data and provides a different transmission protocol if the serial DTV data stream does not include parity data. In this way, the system accommodates a serial DTV data stream with or without parity data. The DTV data format converter may be implemented in the form of a peripheral component interconnect (PCI) card, permitting compatibility with computer systems and other PCI-based systems.

A disclosed embodiment of the DTV data format converter includes a DTV data format converter receiver block for receiving a serial DTV data stream and detecting whether the serial DTV data stream includes parity. The converter also includes a DTV data format converter buffer for loading the serial DTV data stream from the receiver block. The converter further includes a DTV data format converter transmitter block for reading the serial DTV data stream out of the buffer and transmitting a parallel DTV data stream corresponding to the serial DTV data stream. If the serial DTV data stream includes parity data, the transmitter block transmits the parallel DTV data stream converted from the serial DTV data stream in accordance with a first conversion protocol. If the serial DTV data stream does not include parity data, the transmitter block transmits the parallel DTV data stream converted from the serial DTV data stream in accordance with a second conversion protocol.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
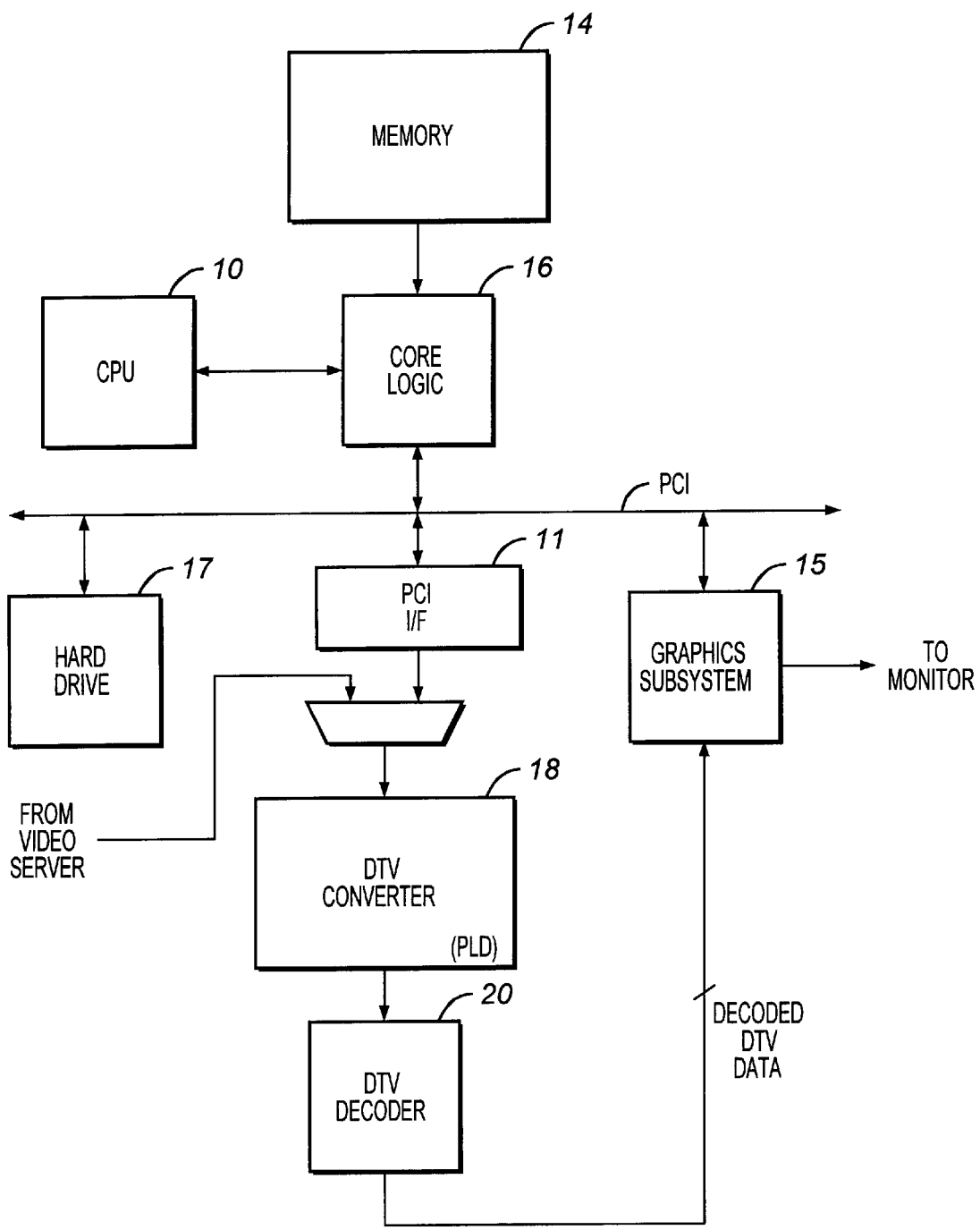
FIG. 1 is a block diagram of a computer system incorporating a DTV data format converter in accordance with the present invention.

Turning now to the drawings, FIG. 1 shows a computer system C incorporating a digital television (DTV) data format converter 18 in accordance with the present invention. The computer system C includes a peripheral component interconnect (PCI) bus 12 coupled to a graphics subsystem 15, a hard drive 17, and a core logic 16. The microprocessor 10, the system memory 14, and the core logic 16 are of a conventional type. An example of suitable core logic is Intel's 440BX. The core logic 16 is coupled upstream to a memory 14 and a microprocessor (CPU) 10.

The core logic 16 is coupled through a PCI interface 11 to the converter 18. The converter 18 receives a serial DTV data stream from a video server or other DTV data transmitter and converts the serial DTV data stream to a parallel DTV data stream. An example of a suitable video server is a MTS 100 system available from Tektronix, Inc. for providing MPEG transport streams. The converter 18 accomplishes automatic parity detection and playback of the serial DTV data stream provided by the video server. The converter 18 also receives a serial clock from the video server. In the disclosed embodiment, the converter 18 is implemented in a programmable logic device (PLD) on a PCI card. An example of a suitable PLD is Altera's EPM7064. The converter 18 provides the parallel DTV data stream to a DTV decoder 20. The DTV decoder 20 is preferably a MPEG-2 video decoder, but may be of other types, such as an MPEG-1 video decoder. An example of a suitable video decoder is the SAA7111 available from Phillips Semiconductor. The DTV decoder 20 provides decoded DTV data to the graphics subsystem 15 which provides the DTV data to a monitor (not shown).

Figure 2:
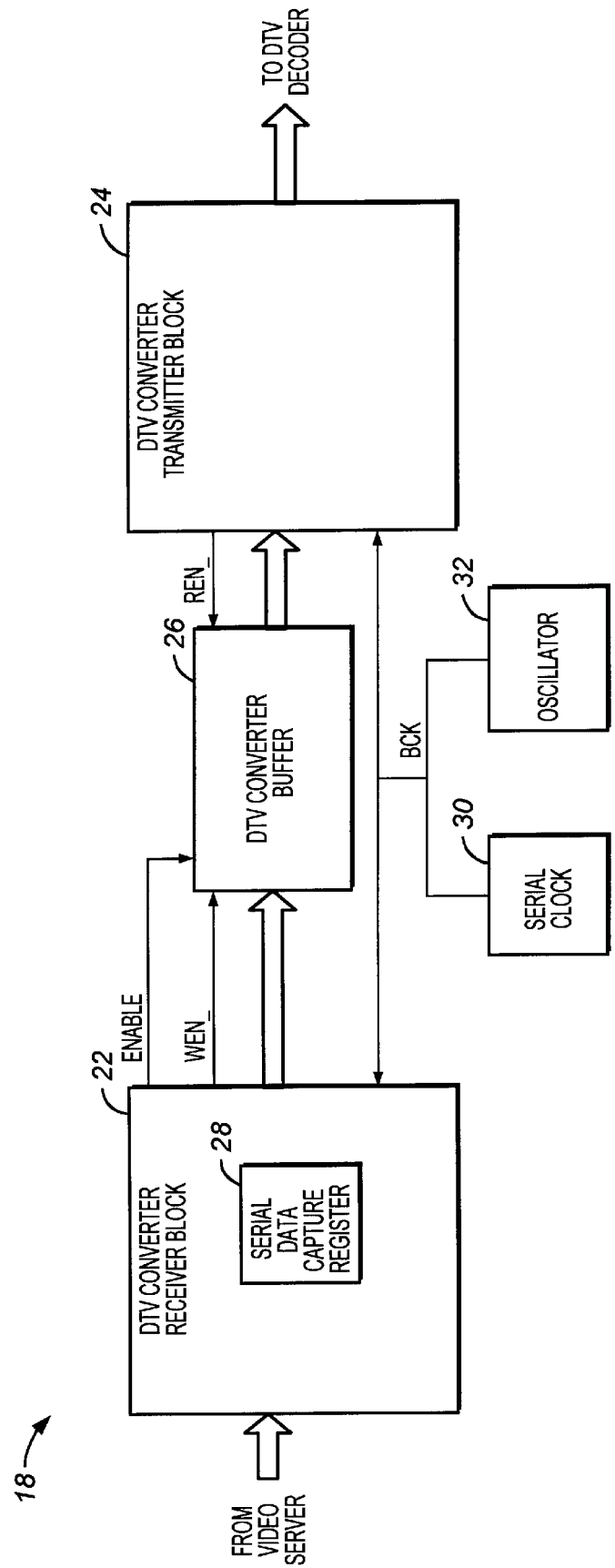
FIG. 2 is a schematic block diagram of an exemplary embodiment of the converter of FIG. 1.

Referring to FIG. 2, an exemplary DTV data format converter 18 is shown. The DTV data format converter 18 is designed to accomplish DTV data format conversion with automatic parity detection for serial DTV data streams. The converter 18 includes a DTV converter receiver block 22 for receiving a serial DTV data stream. The receiver block 22 includes a serial data capture register 28 for holding a portion of the serial DTV data stream. In the disclosed embodiment, the capture register 28 is a byte wide register. The receiver block 22 provides the serial DTV data stream to a DTV data format converter buffer 26. In the disclosed embodiment, the buffer 26 is implemented as a byte wide FIFO. A byte of DTV data is loaded to the buffer 26 after 8 bits have been shifted into the capture register 28. The buffer 26 allows a transmission DTV data rate to be decoupled from a reception DTV data rate. The serial DTV data stream may be provided from the DTV converter buffer 26 to a DTV converter transmitter block 24. Although the converter buffer 26 is shown separately from the receiver block 22 and the transmitter block 24, it should be understood that the converter buffer 26 may be integrated within either the receiver block 22 or the transmitter block 24. It should further be understood that a serial to parallel load register (not shown) may be provided between the capture register 28 and the buffer 26.

When the receiver block 22 is ready to provide a serial DTV data stream to the converter buffer 26, the receiver block 22 asserts a write enable signal WEN_ to the converter buffer 26. When the transmitter block 24 is ready to read the serial DTV data stream from the converter buffer 26, the transmitter block asserts a read enable signal REN_ to the converter buffer 26. As explained below, the receiver block 22 is able to detect whether parity data is present in the serial DTV data stream. Also as explained below, the transmitter block 24 transmits a parallel DTV data stream converted from the serial DTV data stream in accordance with one conversion protocol if a serial DTV data stream includes parity data. If a serial DTV data stream does not include parity data, the transmitter block 24 transmits a parallel DTV data stream converted from the serial DTV data stream in accordance with another conversion protocol. The converter 18 thus may handle a serial DTV data stream with or without parity data.

The converter 18 further includes a serial clock 30 and an oscillator 32. If a serial DTV data stream does not include parity, the oscillator 32 serves as the clock for providing the transmission frequency of the parallel DTV data stream. In such a non-parity mode, the transmission frequency of the parallel DTV data streams including parity data may be synchronized with the reception frequency of serial DTV data streams. In the disclosed embodiment, the reception frequency of a serial DTV data stream is 19.3 MHz, and the transmission frequency for the parity mode is 2.4125 MHz (⅛th of the reception frequency). If a serial DTV data stream does include parity, then the serial clock 30 serves as the clock for providing the transmission frequency for the parallel DTV data stream. During such a parity mode of the transmitter block 24, the transmitter block can send DTV data at any frequency the decoder 20 needs. A system clock BCK combines the functions of the two clocks 30 and 32. Although shown outside the transmitter block 24, the clocks 30 and 32 may be incorporated into the transmitter block 24. It should be understood that configurations of the converter 18 other than that represented in FIG. 2 are possible.

Figure 3:
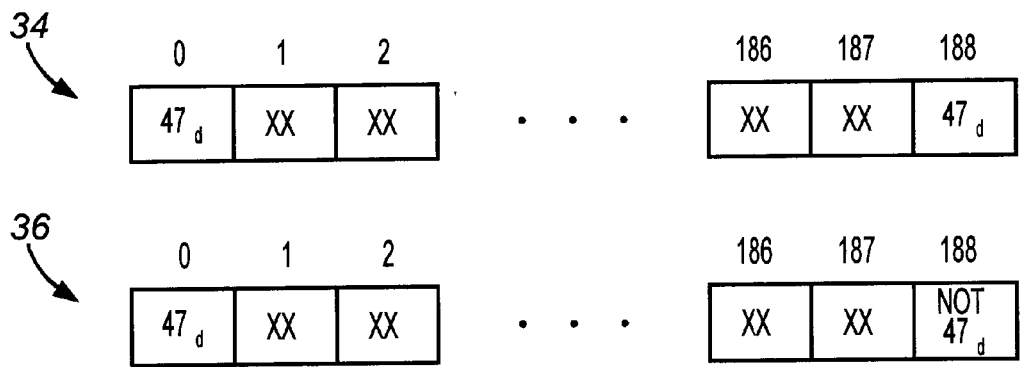
FIG. 3 is an exemplary illustration of a parity serial DTV data stream and a non-parity serial DTV data stream received by the converter of FIG. 2.

Referring to FIG. 3, a parity serial DTV data stream 36 and a non-parity serial DTV data stream 34 are shown. In the disclosed embodiment, a packet of parity serial DTV data includes 187 frames or bytes, and a packet of non-parity serial DTV data includes at least 204 frames. For the first 187 frames, a parity serial DTV data stream and a non-parity serial DTV data stream have an identical data format. The first byte, or byte 0, of both data streams represents the start byte. Frames 1–187 of both streams represent serial DTV data. In the disclosed embodiment, the start byte is '47' in decimal or '01000111' in binary.

The receiver block 22 (FIG. 2) distinguishes between the parity serial DTV data stream 36 and a non-parity serial DTV data stream 34 based on a test frame 188. If a serial DTV data stream provides a start byte in frame 188, then the serial DTV data stream does not include parity data. If a serial DTV data stream does not provide a start byte in frame 188, then the serial DTV data stream includes parity data. It should be understood that the packet size, start byte representation, and test frame for detecting parity shown in FIG. 3 are exemplary and illustrative.

Figure 4:
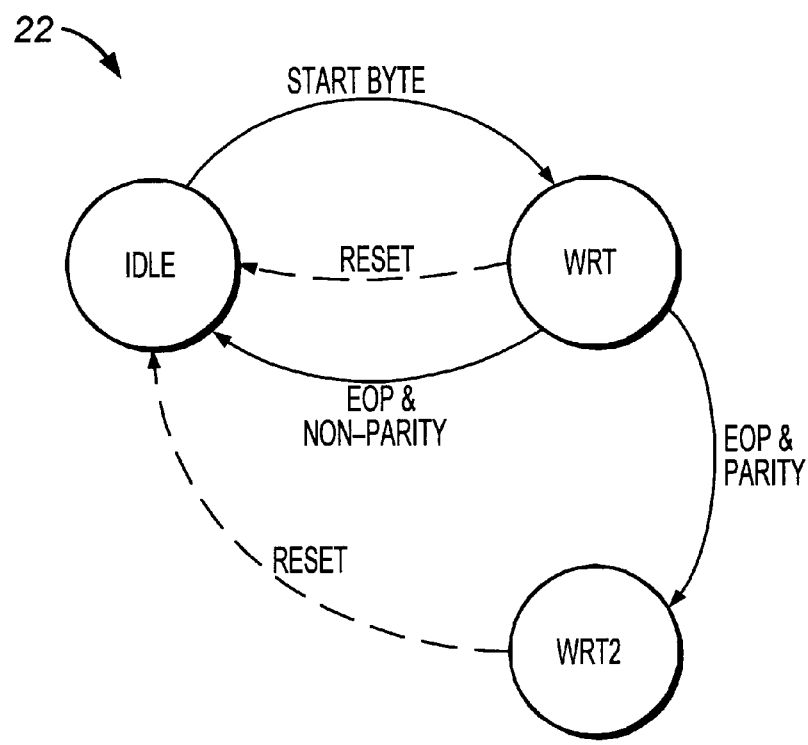
FIG. 4 is an exemplary state diagram of the DTV data format converter transmitter block of FIG. 2.

Referring to FIG. 4, an exemplary state diagram for the receiver block 22 (FIG. 2) is shown. The receiver block 22, or receiver state machine, begins in an IDLE state. Upon detection of a start byte, the receiver block 22 transitions from the IDLE state to a WRT state. If another start byte is detected directly after an end of a packet (EOP), which would indicate that the serial DTV data stream includes parity (PARITY), then the receiver block 22 transitions from the WRT state to the WRT2 state. If a start byte is not detected directly after an end of a packet (EOP), indicating a serial DTV data stream does not include parity data (NON-PARITY), then the receiver block 22 transitions from the WRT state back to the IDLE state. For a non-parity serial DTV data stream, the receiver block 22 transitions back and forth between the IDLE state and the WRT state.

Once the receiver block 22 enters the WRT2 state, then the receiver block 22 remains in the WRT2 state, with the exception of a hard reset signal RESET described below. Within both the WRT state and the WRT2 state, serial DTV data is captured in the capture register 28 (FIG. 2). The WRT2 state represents a parity mode of the receiver block 22.

In the disclosed embodiment, the converter 18 supports a hard reset signal RESET for resetting the converter 18 to a known state when an input clock to the converter 18 stops. An assertion of the reset signal RESET in either the WRT state or the WRT2 state transitions the receiver block 22 to the IDLE state.

Figure 5:
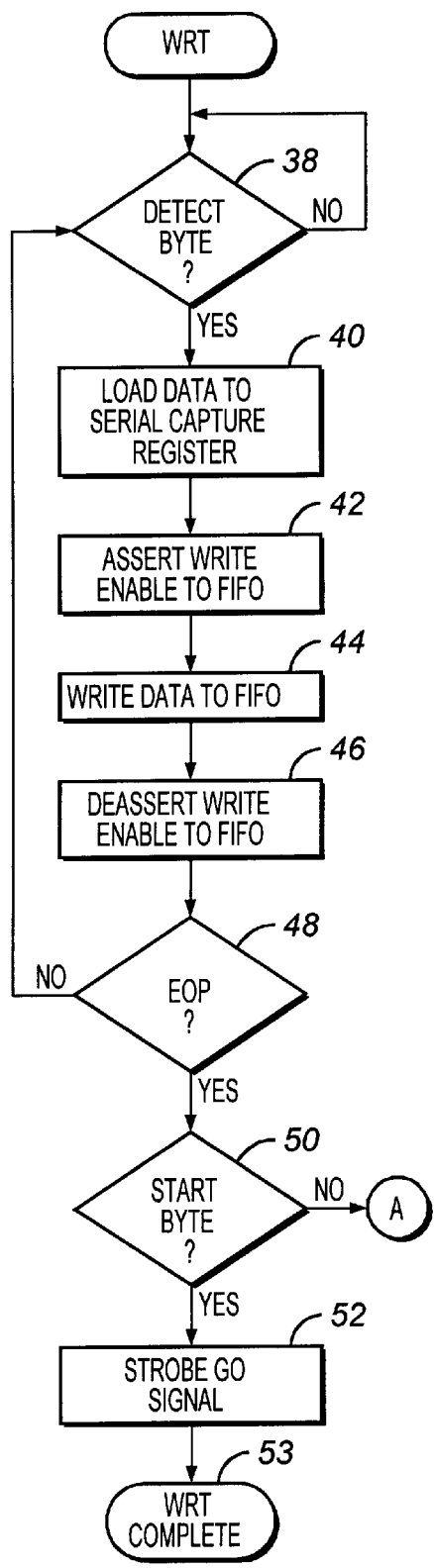
FIG. 5 is an exemplary flow chart for the WRT state of FIG. 4.

Referring to FIG. 5, an exemplary flow chart for the WRT state is shown. Beginning in step 38, it is determined if a byte is ready to be stored. If a byte is ready to be stored, then control proceeds to step 40. In step 40, the serial DTV data stream is loaded to the capture register 28 (FIG. 2). Serial DTV data is thus captured byte-by-byte. Next, control proceeds to step 42 where the write enable signal WR__ is asserted to the buffer 26. Control then proceeds to step 44 where the DTV data is written from the capture register 28 to the buffer 26. Next, in step 46, the write enable signal WR__ is deasserted. In step 38, if a byte is not ready to be stored, then control remains at step 38.

From step 46, control proceeds to step 48 where it is determined if an end of a packet (EOP) has been reached. If the end of a packet (EOP) is detected, then control proceeds to step 50. In step 50, it is determined if a start byte is detected. If a start byte is detected, indicating non-parity serial DTV data, then control proceeds to step 52 where a GO signal is strobed. The use of the GO signal is explained below. If an end of a packet (EOP) is not detected in step 48, then control returns to step 38 to wait for a next byte. From step 52, control also proceeds to step 53 where the WRT state is completed. If a start byte is not detected in step 50, then control proceeds to the WRT2 state (FIG. 6).

Figure 6:
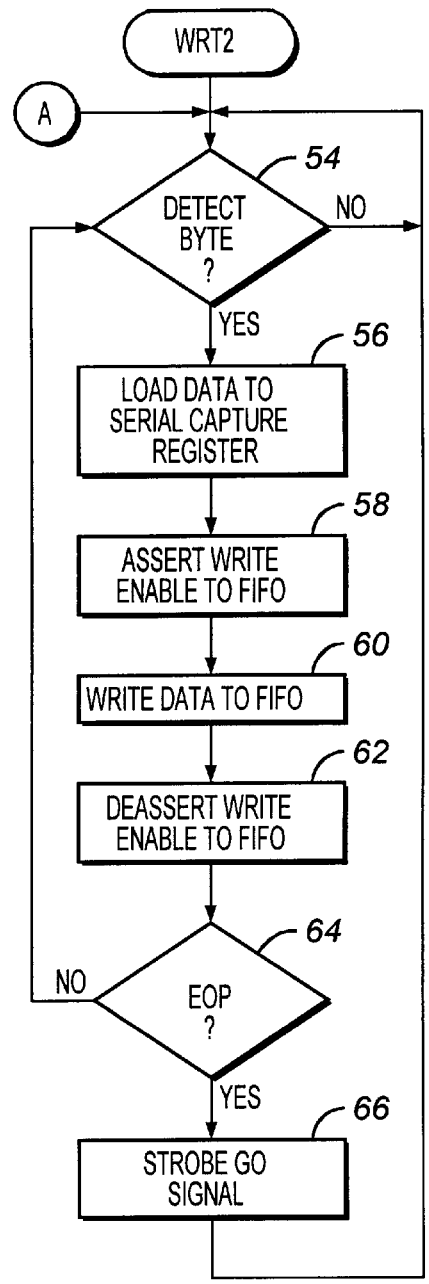
FIG. 6 is an exemplary flow chart for the WRT2 state of FIG. 4.

Referring to FIG. 6, an exemplary flow chart for the WRT2 state is shown. Beginning at step 54, it is determined if a byte is detected. If it is determined that a byte is not detected, then control remains at step 54. If a byte is detected, then control proceeds to step 56 where serial DTV data is loaded to the capture register 28 (FIG. 2). As noted above, the WRT2 state represents the parity mode of the receiver block 22. Next, control proceeds to step 58 where the write enable signal WEN__ is asserted to the buffer 26. From step 58, control passes to step 60 where the DTV data is written from the capture register 28 to the buffer 26. Next, in step 62, the write enable signal WEN__ is deasserted to the buffer 26. From step 62, control proceeds to step 64. In step 64, it is determined if an end of a packet (EOP) has been reached. If an end of a packet (EOP) is detected, then control proceeds to step 66 where the GO signal is strobed. If an end of a packet (EOP) is not detected in step 64, then control proceeds to step 68 to await a next captured byte. From step 66, control returns to step 54.

Figure 7:
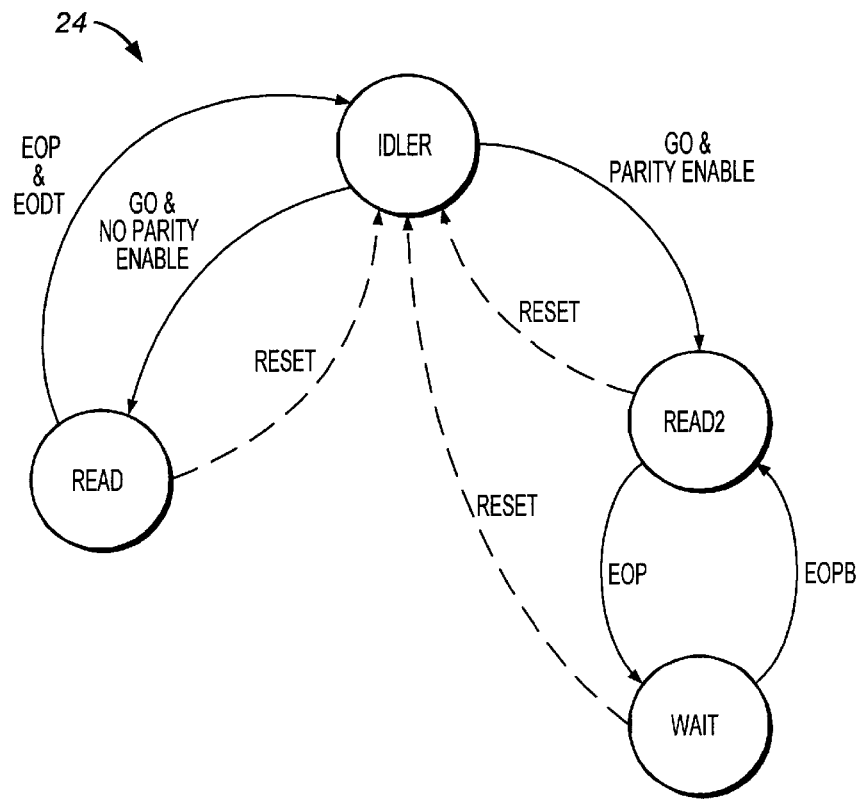
FIG. 7 is an exemplary state diagram of the receiver block of FIG. 2.

Referring to FIG. 7, an exemplary state diagram of the transmitter block 24 (FIG. 2), or transmitter state machine, is shown. The transmitter block 24 begins in an IDLER state. The transmitter block 24 determines whether the converter 18 is in a parity mode or a non-parity mode based on a parity enable signal (PARITY ENABLE). The state of the parity enable signal is set based on detection of a start byte by the receiver block 22. If the converter 18 is in a parity mode (PARITY ENABLE), then the transmitter block 24 transitions from the IDLER state to a READ2 state. If the converter 18 is in a non-parity mode (NO PARITY ENABLE), then the transmitter block 24 transitions from the IDLER state to a READ state. Within both the READ and the READ2 state, DTV data is read out of the buffer 26. In the disclosed embodiment, on each falling edge of the system clock BCK, a next byte is read out of the buffer 26 until a full packet is transmitted.

For the READ2 state, when an end of a packet (EOP) is reached, the transmitter block 24 transitions from the READ2 state to a WAIT state. During the WAIT state, the transmitter block 24 prepares for another packet of data. After the WAIT state, the transmitter block 24 transitions back and forth between the READ2 state and the WAIT state.

During the READ state, a predetermined number of non-enable clocks are generated as dead time. This dead time ensures that a parallel DTV data stream includes the appropriate number of clocks. The dead time, in effect, serves as fake parity. When an end of packet (EOP) and an end of the dead time (EODT) is reached in the READ state, the transmitter block 24 transitions from the READ state back to the IDLER state. Thus, during a non-parity mode of the converter 18, the transmitter block 24 transitions back and forth between the IDLER state and the READ state.

Figure 8:
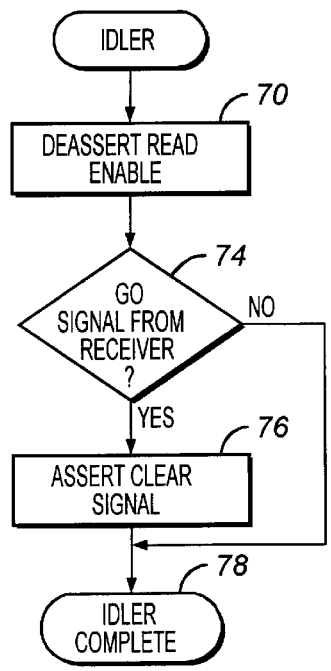
FIG. 8 is an exemplary flow chart for the IDLER state of FIG. 7.

Referring to FIG. 8, an exemplary flow chart for the IDLER state is shown. Beginning at step 70, the read enable signal REN__ to the buffer 26 is deasserted. Control next passes to step 74 where it is determined if the GO signal from the receiver block 22 is asserted. The GO signal informs the transmitter block 24 to begin transmission of the DTV data in the buffer 26. If the GO signal is asserted, then control proceeds to step 76 where a CLEAR signal is asserted. The CLEAR signal when asserted clears the GO signal. If it is determined in step 74 that the GO signal is deasserted, then control proceeds to step 78 where the IDLER state is completed. Control also terminates through step 78 from step 76.

Figure 9:
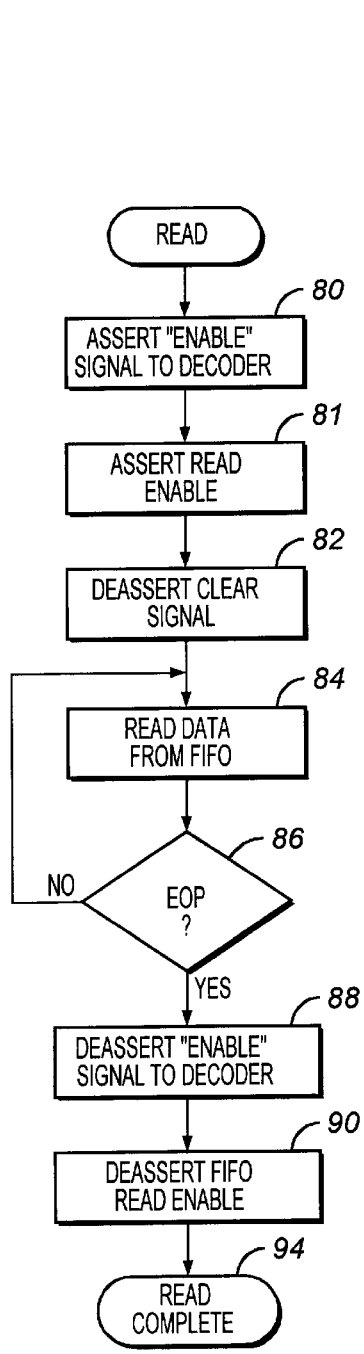
FIG. 9 is an exemplary flow chart for the READ state of FIG. 7.

Referring to FIG. 9, an exemplary flow chart for the READ state is shown. The READ state represents the non-parity mode of the transmitter block 24. Beginning in step 80, the "ENABLE" signal is asserted to the decoder 20. The "ENABLE" signal notifies the decoder 20 of valid data. From step 80, control proceeds to step 81 where the read enable signal REN__ is asserted. Next, in step 82, the CLEAR signal is deasserted. Control then passes to step 84 where the DTV data is read from the buffer 26 by the transmitter block 24. Next, in step 86 it is determined if an end of a packet (EOP) is detected. If an end of a packet (EOP) is not detected, then control returns to step 84. In step 86, if an end of a packet (EOP) is detected, then control proceeds to step 88 where the "ENABLE" signal to the decoder 20 is deasserted. From step 88, control proceeds to step 90 where the read enable signal REN__is deasserted. From step 90, control proceeds to step 94 where the READ state is completed.

Figure 10:
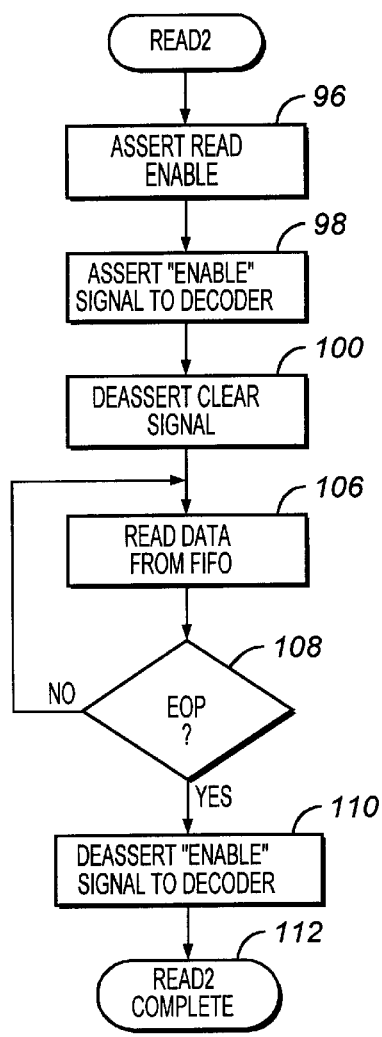
FIG. 10 is an exemplary flow chart for the READ2 state of FIG. 7.

Referring to FIG. 10, an exemplary flow chart for the READ2 state is shown. The READ2 state represents the parity mode of the transmitter block 24. Beginning at step 96, the READ enable signal REN__ is asserted. Next, control proceeds to step 98 where the "ENABLE" signal to the decoder 20 is asserted. Control then passes to step 100 where the CLEAR signal is deasserted. From step 100, control passes to step 106. In step 106, DTV data in the form of valid data and parity bytes is read out of the buffer 26. Next, in step 108, it is determined if an end of a packet (EOP) is detected. If an end of a packet (EOP) is not detected, then control jumps back to step 106. If an end of a packet (EOP) is detected, then control proceeds to step 110 where the "ENABLE" signal is deasserted to the decoder 20. From step 110, control proceeds to step 112 where the READ2 state is completed.

Figure 11:
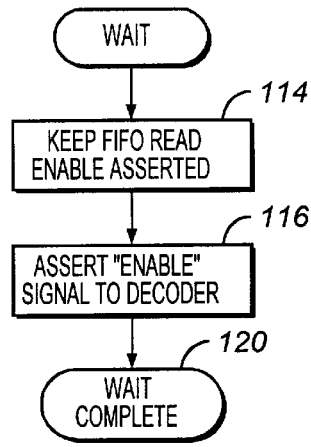
FIG. 11 is an exemplary flow chart for the WAIT state of FIG. 7.

Referring to FIG. 11, an exemplary flow chart for the WAIT state is shown. Beginning at step 114, the read enable signal REN__ to the buffer 26 is kept asserted. Control then proceeds to step 116 where the "ENABLE" signal to the decoder 20 is asserted. In this way, the decoder 20 is informed that any data which follows is valid. From step 116, control proceeds to step 120 where the WAIT state is completed. It should be understood that the order of the operational steps for the flow charts described herein may vary. The state machines 22 and 24 described herein represent the conversion protocols for converting a serial DTV data stream with or without parity to a parallel DTV data stream.

Provided below is exemplary hardware description code (in this case, Verilog) for the transmitter block 24 and the receiver block 22 along with a table providing general descriptions for the variables within the code. Those skilled in the art will readily relate and correlate the table and code below with the other disclosure provided herein. It should be apparent to those skilled in the art that other implementations of the converter 18 are possible.

| VARIABLE NAME | DESCRIPTION |
|---|---|
| TPD, D_TPD | Serial to parallel load register; FIFO in data |
| WEN_, D_WEN | Write enable for FIFO |
| ENABLEB | Ored result of ENABLE and ENABLEPAR serving as valid data bit to decoder |
| BCK, BCKD | System clock generated to accommodate serial DTV data with or without parity |
| REN_ | Read enable for FIFO |
| PARITYEN, D_PARITYEN | Flag indicating if parity data is present in serial DTV data stream |
| RCLK, RCKLD | Oscillator used in non-parity mode |
| DCLK | Input clock to converter |
| ENABLEPAR | Early valid signal to decoder (active high) |
| GOBACK, D_GOBACK | Start signal generated by receiver state machine |
| START | Start signal for transmitter state machine |
| ENABLE, D_ENABLE | Synchronous valid signal to decoder |
| CLEAR_, D_CLEAR | Clear signal for GOBACK signal |
| CLK1 | ½ frequency of DCLK |
| CLK2 | ¼ frequency of DCLK |
| CLK3 | Serial clock for parity mode; ⅛ frequency of DCLK |
| ADDRW, ADDR | Address counter to track address location in DTV data stream |
| SERDAT | Serial capture register for holding incoming serial DTV data stream |
| COUNT | Counter for counting number of bits received by SERDAT |
| STATE, D_STATE | State variable for transmitter state machine |
| WSTATE, D_WSTATE | State variable for receiver state machine |
| RESET_ | Hard reset signal for converter |
| DATAIN | Input serial data signal |
| RST_ | Ored result of RESET_ and CLEAR_ |

```
module test  (tpd, wen_, enableb, bck, ren_, parityen,
              rclkd,
              datain, reset_, dclk, rclk, bckd);
input datain, reset_, dclk, rclk, bckd;
inout rclkd;
output       wen_, enableb, bck, ren_, parityen;
output[7:0]  tpd;
reg  d_wen_, wen_, enablepar,
     d_goback, goback, start, startb, d_enable, enable,
     ren_, d_clear_, clear_, clk1, clk2, clk3, d_parityen, parityen;
reg[7:0]   addrw, serdat, d_tpd, tpd, addr;
reg[2:0]   count;
reg[1:0]   d_state, state, d_wstate, wstate;
parameter IDLE = 2'h0;
parameter WRT = 2'h1;
parameter WRT2 = 2'h3;
parameter IDLER = 2'h0;
parameter READ = 2'h1;
parameter READ2 = 2'h2;
parameter WAIT = 2'h3;
bufif1 (rclkd, !bckd, reset_);
wire bck = (rclk && !parityen) || (clk3 && parityen);
wire rst_ = reset_ && clear_;
```

-continued

```
wire enableb = enable || enablepar;
always @(posedge dclk)
    clk1 <= !clk1;
always @(posedge clk1)
    clk2 <= !clk2;
always @(posedge clk2)
    clk3 <= !clk3;
always @(posedge goback or negedge rst_)
begin
    if (!rst_)
        start <= 0;
    else
        start <= 1;
end
always @(posedge rclkd)
begin
    startb <= start;
    if (state == IDLER)
        addr[7] <= 8'h00;
    else if (state == WAIT)
        addr[7] <= 8'h01;
    else
        addr[7] <= addr[7:0] =1;
end
always @(posedge rclkd or negedge reset_)
begin
    if (!reset_)
    begin
        state <= IDLER;
        clear_ <= 1;
        enable <= 0;
    end
    else
    begin
        state <= d_state;
        clear_ <= d_clear_;
        enable <= d_enable;
    end
end
always @(posedge dclk)
begin
    if (wstate == IDLE)
        count[2:0] <= 3'h7;
    else
        count[2:0] <= count [2:0] + 1;
end
always @(posedge dclk)
begin
    if (wstate == IDLE)
        addrw[7:0] <= 8'h00;
    else if (count[2:0] == 3'h7)
        addrw[7:0] <= addrw[7:0] + 1;
end
always @(posedge dclk or negedge reset_)
begin
    if (!reset_)
    begin
        serdat[7:0] <= 8'h00;
        tpd[7:0] <= 8'h00;
        wstate <= IDLE;
        wen_ <= 1;
        goback <= 0;
        parityen <= 0;
    end
    else
    begin
        serdat[7:0] <= {serdat[6:0],datain};
        tpd[7:0] <= d_tpd[7:0];
        wstate <= d_wstate;
        wen_ <= d_wen_;
        goback <= d_goback;
        parityen <= d_parityen;
    end
end
always @(wstate or tpd or wen_ or datain or parityen or
         count or serdat or addrw or goback)
begin
    d_wstate = wstate;
    d_tpd[7:0] = tpd[7:0];
```

```
            d_wen_ <= wen_;
            d_goback <= goback;
            d_parityen <= parityen;
    case (wstate)     //synopsys parallel_case full_case
    IDLE:
    begin
            d_goback = 0;
            if ((serdat[6:0] == 7'h23) && datain)
                    d_wstate = WRT;
    end
    WRT:
    begin
            if (count[2:0] == 3'h7)
            begin
                    d_tpd[7:0] = serdat[7:0];
                    d_wen_ = 0;
            end
            else
                    d_wen_ = 1;
            if ((addrw[7:0] == 8'hbc) && (count[2:0] == 3'h5))
            begin
                    d_wstate = IDLE;
                    d_goback = 1;
            end
            else
                    d_wstate = WRT2;
            end
    end
    WRT2:
    begin
            d_parityen = 1;
            if (count[2:0] == 3'h7)
            begin
                    d_tpd[7:0] = serdat[7:0];
                    d_wen_ = 0;
            end
            else
                    d_wen_ = 1;
            if (addrw[7:0] == 8'hdc)
                    d_goback = 1;
    end
    endcase
    end
    always @(state or clear_ or enable or startb or addr or parityen)
    begin
            d_clear_ = clear_;
            d_state = state;
            d_enable = enable;
    case (state)     //synopsys parallel_case full_case
    IDLER:
    begin
            ren_ = 1;
            enablepar = 0;
            if (startb)
            begin
                    d_clear_ = 0;
                    if (parityen)
                            d_state = READ2;
                    else
                            d_state = READ;
            end
    end
    READ:
    begin
            ren_ = (addr[7:0] == 8'hbc);
            enablepar = 0;
            d_clear_ = 1;
            if (addr[7:0] == 8'hbc)
            begin
                    d_enable = 0;
                    d_state = IDLER;
            end
            else
                    d_enable = 1;
    end
    READ2:
    begin
            ren_ = 0;
            enablepar = 0;
            d_clear_ = 1;
            if(addr[7:0] == 8'h00)
                    d_enable = 1;
            if (addr[7:0] == 8'hbc)
            begin
                    d_enable = 0;
            end
            if (addr[7:0] == 8'hd0)
                    d_state = WAIT;
    end
    WAIT:
    begin
            ren_ = 0;
            enablepar = 1;
            d_enable = 1;
            d_state = READ2;
    end
    endcase
    end
    endmodule
```

Although a computer system in accordance with the present invention is illustrated, it should be understood that the present invention is applicable to other DTV data handling systems, particularly PCI-based systems. It should further be understood that other circuitry and techniques of accomplishing DTV data format conversion with automatic parity detection according to the invention are possible.

The disclosure and description of the preferred embodiment are illustrative and explanatory thereof, and various changes in the variables, parameters, steps, fields, data types, code elements, code size, buffer size, register size, packet size, connections, components, logic, and signals, as well as in the details of the illustrated circuitry and construction and method of operation may be made without departing from the spirit of the invention.

We claim:

1. A method of converting digital television data, comprising the steps of:
   receiving a serial digital television data stream;
   detecting whether parity data is in the serial digital television data stream;
   transmitting a parallel digital television data stream converted from the serial digital television data stream in accordance with a first conversion protocol if parity data is detected in the serial digital television data stream; and
   transmitting a parallel digital television data stream converted from the serial digital television data stream in accordance with a second conversion protocol if parity data is not detected in the serial digital television data stream.

2. The method of claim 1, the step of transmitting a parallel digital television data stream converted from the serial digital television data stream in accordance with a second conversion protocol comprising the step of:
   transmitting the parallel digital television data stream at a predetermined frequency such that the parallel digital television data stream is transmitted at the same rate as the serial digital television data stream is received.

3. The method of claim 1, further comprising the step of:
   injecting dead time into the parallel digital television data stream as part of the second conversion protocol.

4. The method of claim 1, the detecting step comprising the step of:
   detecting a start byte at a predetermined location in the serial digital television data stream.

5. The method of claim 4, further comprising the step of:
interpreting detection of the start byte at the predetermined location as an indication that the serial digital television data stream is a non-parity data stream.

6. A digital television data format converter, comprising:
a digital television data format converter receiver block for receiving a serial digital television data stream and detecting whether parity data is in the serial digital television data stream;
a digital television data format converter buffer for loading the serial digital television data stream from the digital television data format converter receiver block; and
a digital television data format converter transmitter block for reading the serial digital television data stream out of the digital television data format converter buffer, transmitting a parallel digital television data stream converted from the serial digital television data stream in accordance with a first conversion protocol if the serial digital television data stream is a parity data stream, and transmitting a parallel digital television data stream converted from the serial digital television data stream in accordance with a second conversion protocol if the serial digital television data stream is a non-parity data stream.

7. The converter of claim 6, the digital television data format converter receiver block comprising:
a serial capture register for holding the serial digital television data stream.

8. The converter of claim 6, further comprising:
a first clock for supplying a first predetermined conversion frequency for the parallel digital television data stream if the serial digital television data stream is a parity data stream; and
a second clock for supplying a second predetermined conversion frequency for the parallel digital television data stream if the serial digital television data stream is a non-parity data stream.

9. The converter of claim 6, wherein the digital television data format converter receiver block provides a write enable signal to the digital television data format converter buffer.

10. The converter of claim 6, wherein the digital television data format converter transmitter block provides a read enable signal to the digital television data format converter buffer.

11. A digital television data format converter, comprising:
a receiver means for receiving a serial digital television data stream;
a detecting means for detecting whether parity data is in the serial digital television data stream;
a first transmitter means for transmitting a parallel digital television data stream converted from the serial digital television data stream in accordance with a first conversion protocol if parity data is detected in the serial digital television data stream; and
a second transmitter means for transmitting a parallel digital television stream converted from the serial digital television data stream in accordance with a second conversion protocol if parity data is not detected in the serial digital television data stream.

12. The converter of claim 11, further comprising:
a first clock means for supplying a first predetermined frequency for the parallel digital television data stream if the serial digital television data stream is a parity data stream; and
a second clock means for supplying a second predetermined frequency for the parallel digital television data stream if the serial digital television stream is a non-parity data stream.

13. The converter of claim 11, the detecting means comprising:
a means for detecting a start byte at a predetermined location in the serial digital television data stream.

14. The converter of claim 13, further comprising:
a means for interpreting detection of the start byte at the predetermined location as an indication that the serial digital television data stream is a non-parity data stream.

15. The converter of claim 11, further comprising:
a means for injecting dead time into the parallel digital television data stream as part of the second conversion protocol.

16. A system, comprising:
a local bus; and
a digital television data format converter coupled to the local bus, comprising:
a digital television data format converter receiver block for receiving a serial digital television data stream and detecting whether parity data is in the serial digital television data stream;
a digital television data format converter buffer for loading the serial digital television data stream from the digital television data format converter receiver block; and
a digital television data format converter transmitter block for reading the serial digital television data stream out of the digital television data format converter buffer, transmitting a parallel digital television data stream converted from the serial digital television data stream in accordance with a first conversion protocol if the parallel digital television data stream is a parity data stream, and transmitting a parallel digital television data stream converted from the serial digital television data stream in accordance with a second conversion protocol if the serial digital television data stream is a non-parity data stream.

17. The system of claim 16, wherein the local bus comprises a peripheral component interconnect (PCI) bus.

18. The system of claim 16, wherein the digital television data format converter is implemented on a peripheral component interconnect (PCI) card.

19. The system of claim 16, wherein the digital television data format converter comprises a programmable logic device.

20. The system of claim 16, wherein the digital television data format converter receiver block and the digital television data format converter transmitter block comprise state machines.

21. The system of claim 16, the digital television data converter receiver block comprising:
a serial capture register for holding the serial digital television data stream.

22. The system of claim 16, the digital television data format converter further comprising:
a first clock for supplying a first predetermined conversion frequency for the parallel digital television data stream if the serial digital television data stream is a parity data stream; and
a second clock for supplying a second predetermined conversion frequency for the parallel digital television data stream if the serial digital television data stream is a non-parity data stream.

23. The system of claim 16, wherein the digital television data converter is implemented in a digital television data receiver.

24. The system of claim 16, wherein the digital television data format converter receiver block provides a write enable signal to the digital television data format converter buffer.

25. The system of claim 16, wherein the digital television data format converter transmitter block provides a read enable signal to the digital television data format converter buffer.

26. A system, comprising:

a local bus; and a digital television data format converter coupled to the local bus, comprising:

a receiver means for receiving a serial digital television data stream;

a detector means for detecting whether parity data is in the serial digital television data stream;

a first transmitter means for transmitting a parallel digital television data stream converted from the serial digital television data stream in accordance with a first conversion protocol if parity data is detected in the serial digital television data stream; and a second transmitter means for transmitting a parallel digital television stream converted from the serial digital television data stream in accordance with a second conversion protocol if parity data is not detected in the serial digital television data stream.

27. The system of claim 26, wherein the local bus comprises a peripheral component interconnect (PCI) bus.

28. The system of claim 26, wherein the digital television data format converter is implemented on a peripheral component interconnect (PCI) card.

29. The system of claim 26, the digital television data format converter further comprising:

a first clock means for supplying a first predetermined frequency for the parallel digital television data stream if the serial digital television data stream is a parity data stream; and a second clock means for supplying a second predetermined frequency for the parallel digital television data stream if the serial digital television data stream is a non-parity data stream.

30. The system of claim 26, the detecting means comprising:

a means for detecting a start byte at a predetermined location in the serial digital television data stream.

31. The system of claim 26, the digital television data format converter further comprising:

a means for injecting dead time in the parallel digital television data stream as part of the second conversion protocol.

32. The system of claim 26, wherein the digital television data format converter is implemented in a digital television data receiver.

* * * * *